(12) United States Patent
Seybold et al.

(10) Patent No.: US 8,392,222 B1
(45) Date of Patent: Mar. 5, 2013

(54) METHOD AND APPARATUS TO FACILITATE DETERMINING INSURANCE POLICY ELEMENT AVAILABILITY

(75) Inventors: John Seybold, Palo Alto, CA (US); Clark Allan Heydon, San Francisco, CA (US)

(73) Assignee: Guidewire Software, Inc., Foster City, CA (US)

( * ) Notice: Subject to any disclaimer, the term of this patent is extended or adjusted under 35 U.S.C. 154(b) by 30 days.

(21) Appl. No.: 13/207,256

(22) Filed: Aug. 10, 2011

Related U.S. Application Data

(63) Continuation of application No. 12/058,342, filed on Mar. 28, 2008, now abandoned.

(51) Int. Cl.
*G06Q 40/00* (2006.01)

(52) U.S. Cl. ............... 705/4; 507/35; 507/37; 507/27.1; 507/27.24; 463/25

(58) Field of Classification Search ............. 705/4, 27.1, 705/37, 35, 7.24; 463/25
See application file for complete search history.

(56) References Cited

U.S. PATENT DOCUMENTS

| | | | |
|---|---|---|---|
| 5,655,085 A * | 8/1997 | Ryan et al. ................ | 705/4 |
| 2002/0035488 A1 | 3/2002 | Aquila et al. | |
| 2004/0143464 A1 * | 7/2004 | Houle et al. .............. | 705/4 |
| 2004/0225535 A1 | 11/2004 | Bond et al. | |
| 2007/0156463 A1 * | 7/2007 | Burton et al. ............. | 705/4 |
| 2007/0214020 A1 | 9/2007 | Srinivasan et al. | |
| 2011/0066454 A1 | 3/2011 | Rosauer et al. | |

OTHER PUBLICATIONS

"Data Pump Export"; Oracle Database Utilities 10g Release 2; 1996.*

* cited by examiner

*Primary Examiner* — Harish T Dass
(74) *Attorney, Agent, or Firm* — Van Pelt, Yi & James LLP

(57) ABSTRACT

A computing platform (201) of choice can be configured and arranged to access (102 and 103) a first memory (202) that stores attributes which specifically characterize a particular candidate insurance entity and a second memory (203) that stores mappings which relate insurance policy element availability for a plurality of insurance policy elements to various corresponding insurance entity characterizing attributes. The aforementioned attributes, by one approach, correspond to respective end user-configurable dimensions. This platform can then serve (104) as a matching component by automatically using the aforementioned mappings to determine available insurance policy elements for the particular candidate insurance entity as a function of these attributes and then automatically using (105) those available insurance policy elements to configure an insurance policy consistent with these mappings.

25 Claims, 1 Drawing Sheet

METHOD AND APPARATUS TO FACILITATE DETERMINING INSURANCE POLICY ELEMENT AVAILABILITY

CROSS REFERENCE TO OTHER APPLICATIONS

This application is a continuation of co-pending U.S. patent application Ser. No. 12/058,342, entitled METHOD AND APPARATUS TO FACILITATE DETERMINING INSURANCE POLICY ELEMENT AVAILABILITY filed Mar. 28, 2008 which is incorporated herein by reference for all purposes.

TECHNICAL FIELD

This invention relates generally to the automated facilitation of insurance policy configuration.

BACKGROUND OF THE INVENTION

The offering and administration of insurance comprises a well-understood area of practice in that the primary essentials of the business have been well settled for generations. Generally speaking, an insurer agrees to provide monetary compensation to an insured party at such time as the insured party shall experience a covered loss. That said, however, properly configuring an insurance policy for a given insured party can present any number of considerable challenges.

As but one example in this regard, for any given generic insurance risk a given insurer may, or may not, offer corresponding insurance coverage. More particularly, this variability can comprise a function of many factors including, but not limited to, such things as the proposed period of coverage and/or more specific information regarding the insurance risk and/or the party seeking insurance coverage. Coverage availability for a given insurance risk can also vary, for example, as a function of the legal jurisdiction within which the coverage will apply. As one simple example in this regard, laws and regulations regarding insurance coverage requirements and limitations can and do vary greatly from one state to another within the United States.

While circumstances such as these complicate determining coverage availability for a given insurance risk for a given candidate insured party, the problem grows considerably when remembering that a typical modern insurance policy can address a large number of different such insurance risks. When dozens, or even hundreds, of such risks require attention the task of properly configuring a corresponding policy can be difficult. In addition, policies can contain a large number of elements that must be present to exactly characterize the coverage offered by the policy, This, in turn, can require the services of experienced, well trained personnel to ensure proper policy configuration.

Those skilled in the art will further recognize that these difficulties are not limited to only the initial configuration of such a policy. These very same considerations can arise during the life of a given policy (when, for example, local laws or regulations require, or provide an opportunity for, a corresponding change) or at a time of renewing such a policy. Correctly, quickly, and efficiently determining insurance policy element availability is therefore seen to comprise a recurrent cradle-to-grave issue for modern insurers.

BRIEF DESCRIPTION OF THE DRAWINGS

Various embodiments of the invention are disclosed in the following detailed description and the accompanying drawings.

The above needs are at least partially met through provision of the method and apparatus to facilitate determining insurance policy element availability described in the following detailed description, particularly when studied in conjunction with the drawings, wherein.

Figure 1:
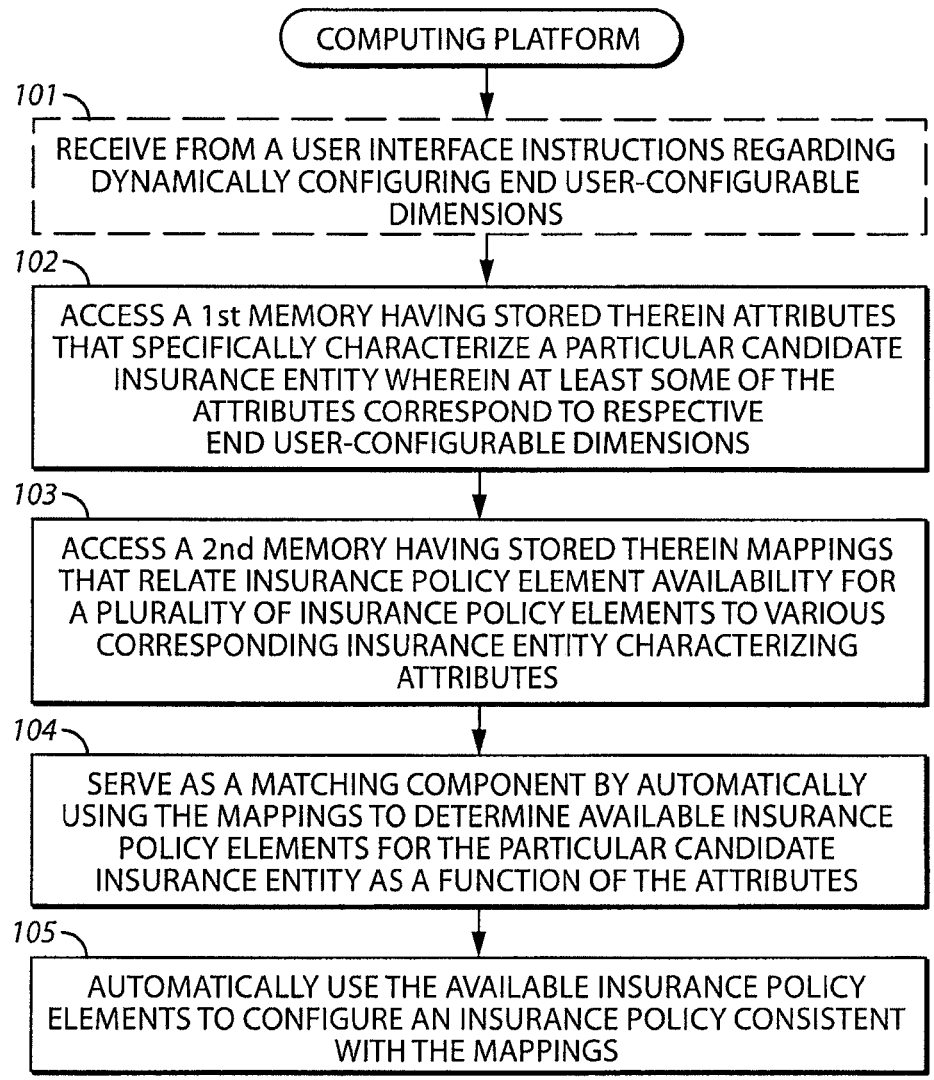
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generally speaking, pursuant to these various embodiments, a computing platform of choice can be configured and arranged to access a first memory that stores attributes which specifically characterize a particular candidate insurance entity and a second memory that stores mappings which relate insurance policy element availability for a plurality of insurance policy elements to various corresponding insurance entity characterizing attributes. The aforementioned attributes, by one approach, correspond to respective end user-configurable dimensions. This platform can then serve as a matching component by automatically using the aforementioned mappings to determine available insurance policy elements for the particular candidate insurance entity as a function of these attributes and then automatically using those available insurance policy elements to configure an insurance policy consistent with these mappings.

By one approach, at least some of these insurance policy elements can each have a corresponding plurality of the end user-configurable dimensions. In such a case, and again if desired, these end user-configurable dimensions as correspond to a given one of the insurance policy elements can accommodate differing combinations of the insurance entity characterizing elements.

As mentioned above, at least some of the attributes can correspond to respective end user-configurable dimensions. By one approach, these teachings will accommodate permitting an administrator to dynamically configure these end-user configurable dimensions via, for example, a corresponding user interface to the aforementioned computing platform. This can specifically comprise, by way of example and not by way of limitation, permitting the administrator to add additional insurance entity characterizing dimensions, delete an existing insurance entity characterizing dimension, and/or change an existing insurance entity characterizing dimension. These teachings will also accommodate, if desired, permitting the administrator to correlate a given one of the end user-configurable dimensions to at least one instruction regarding how to determine the insurance entity characterizing attribute which correlates to that end user-configurable dimension.

These teachings will also accommodate a variety of ways by which this information regarding available insurance policy elements can be used to configure an insurance policy. By one example, this can comprise automatically providing options (for example, to an end user) regarding a plurality of available insurance policy elements which are available to select and incorporate into an insurance policy. By another example, this can comprise automatically identifying insurance policy elements for an existing policy that are no longer available and which should be removed. As yet another example, this can comprise automatically adding elements to an existing policy that are identified as being presently required. Other possibilities of course exist in this regard.

So configured, those skilled in the art will recognize and appreciate that these teachings provide a reliable and efficient mechanism for identifying, for a given policy and with respect to a particular candidate insurance entity, which insurance policy element, or elements, are in fact available. More particularly, these teachings are highly scalable and will therefore accommodate a very large number of dimensions, insurance policy elements, and attributes. Generally speaking, in fact, the larger the quantity for any of these factors, the more pronounced the benefits of applying these teachings in lieu of prior practices in this regard.

It will also be appreciated that, notwithstanding such telling benefits, these teachings will also tolerate, and in fact readily accommodate, great flexibility with respect to the dynamic configuration of the corresponding dimensions that essentially specify the boundaries and overall ambit of the underlying inquiry by the end user. This, in turn, provides an end user insurer with great freedom to significantly customize this process to thereby readily accommodate the various nuances and differences that characterize the specific criteria of interest to this particular insurer.

These and other benefits may become clearer upon making a thorough review and study of the following detailed description. Referring now to the drawings, and in particular to FIG. 1, an illustrative process that is compatible with many of these teachings will now be presented. Those skilled in the art will recognize and understand that this illustrative process 100 can be carried out using any of a wide variety of computing platforms.

As noted above, these teachings relate to the provision and use of mappings that relate attributes for different dimensions to insurance policy element availability. As used herein, "insurance policy element" will be understood to refer to some required or optional component such as, but not limited to, coverages (which specify the causes of loss for which payment is guaranteed by the policy), coverage terms (which specify the conditions and limits as pertain to the coverages), forms and endorsements (which further characterize the scope of coverage offered by the policy), modifiers, and exclusions.

The expression "dimensions," in turn, will be understood to refer to various discrete and defined categories of characterizing descriptions as can be relevant to determining the availability of a given insurance policy element for a particular candidate insurance entity. Examples in this regard can include a country dimension as relates to the country within which the insurance coverage is to extend, a local jurisdiction dimension as relates to the state, province, or territory within which the insurance coverage is to extend, a business characterization dimension as relates to a standardized description of the type of business to which the insurance coverage is to extend (such as, for example, a Standard Industrial Classification (SIC) code), an effective date dimension as relates to an effective date for the insurance coverage, an expiration date dimension as relates to an expiration date for the insurance coverage, and so forth. Those skilled in the art will recognize that other possibilities exist in this regard as well with yet others likely to be developed going forward.

As illustrated in FIG. 1, this process 100 will readily accommodate optionally permitting an end user, such as an administrator (or other authorized person) for the insurer, to dynamically configure these dimensions. In a more typical prior art configuration, those skilled in the art will recognize that such flexibility is not ordinarily tolerated or well accommodated. Instead, the dimensions to be defined and utilized in such a system are set and established by the manufacturer and/or by an end user administrator during an initial set-up and configuration exercise prior to releasing the process for ordinary usage within the enterprise. The present process 100 can be used in such a setting if desired, but many application settings will likely benefit from making use of this dynamic configuration option.

In particular, this process 100 will optionally provide for receiving 101 (via, for example, a corresponding user interface such as a keyboard, a cursor control device, or the like) instructions regarding dynamically configuring one or more of these dimensions. By one approach, this can comprise receiving such instructions at any of a variety of times during the operational life of the program(s) that serves to affect this process 100. The specific nature of these instructions can vary with the needs and/or opportunities as tend to characterize a given application setting. By one approach, for example, these instructions can provide for dynamically configuring the end user-configurable dimensions with respect to adding additional insurance entity characterizing dimensions. As another example, this can comprise deleting one or more of the insurance entity characterizing dimensions as may already have been specified. And as yet another example, this can comprise changing one or more of the insurance entity characterizing dimensions.

In some cases, this dynamic configuration can include, for example, creating a new column or row in a corresponding table and assigning a corresponding identifying name to that new column or row. As an example in this regard, an end user could add a column to a series of already-defined dimension columns and assign the name "building age" to this new column. The attribute values entered with respect to this new dimension could then be used to assess insurance policy element availability as a function of age as pertains to a building for which insurance coverage is sought.

In some cases, alone or in conjunction with the approaches set forth above, this dynamic configuration can include, for example, correlating a given one of the end user-configurable dimensions to at least one instruction regarding how to determine the insurance entity characterizing attribute that correlates to this particular end-user configurable dimension. By one approach, and again by way of example, such an instruction can comprise an administrator-entered expression which, when evaluated by a scripting engine, yields the aforementioned attribute. To illustrate by way of example, such an instruction could comprise "policy.insured.primarySICcode." Such a script, when evaluated by a corresponding scripting engine, would return a value to be used as the corresponding attribute. Scripting engines and the use of scripts comprise a generally well understood area of endeavor. Accordingly, for the sake of brevity and simplicity, further elaboration will not be presented here in this regard.

For the purposes of illustration and without intending any limitations in this regard, the remaining examples set forth in this description will presume that there are four dimensions of interest. These dimensions are denoted herein as "State" (which refers to a particular state of the United States), "SIC" (which refers to an industrial classification identifier according to the well known Standard Industrial Classification (SIC) coding system), "EffDate" (which refers to the effective date for a given candidate insurance entity), and "ExpDate" (which refers to the expiration date for a given candidate insurance entity).

With continued reference to FIG. 1, this process 100 then provides for accessing 102 a first memory having stored therein attributes that specifically characterize a particular candidate insurance entity. By one approach, and for the sake of using a non-limiting illustrative example, these particular candidate insurance entities can comprise risks to be insured (such as a risk of fire damage to a home, a risk of compensating a homeowner for temporary living facilities when forced from their home due to a fire, and so forth). (Those skilled in art will readily understand that there can be other examples of candidate insurance entities, such as specific items to be insured, a candidate policyholder's residential address, information about the broker who seeks to sell the policy, and so forth.)

These stored attributes can comprise, for example, specific values for the aforementioned end user-configurable dimensions. These values might be stored, for example, in the form of a table. An illustrative example is presented in Table 1 for a given corresponding candidate insurance entity such as a particular risk to be insured.

TABLE 1

| State | SIC | EffDate |
|-------|-----|---------|
| California | 001 | Jan. 1, 2009 |

Such information serves to represent, for example, that the party who is engaged in the business activity denoted by "001" with respect to the SIC classification system is seeking insurance to insure against a particular risk in the State of California, which coverage is to become effective on Jan. 1 of 2009. Such information can be entered into this first memory on an ad hoc and an as-needed basis if desired, or can comprise a part of a longer term store of information.

This process 100 also provides for accessing 103 a second memory (which may be the same memory as the first memory or not, as desired) having stored therein mappings that relate insurance policy element availability for a plurality of insurance policy elements to various corresponding insurance entity characterizing attributes. Those skilled in the art will recognize that there are various ways by which this can be accomplished. By one approach, for example, this can comprise the use of a table-based approach where many of the columns represent information on a dimension-by-dimension basis and where the rows represent various ones of the insurance policy elements. An illustrative example in this regard is set forth in Table 2.

TABLE 2

| CovID | Availability | State | SIC | EffDate | ExpDate |
|-------|--------------|-------|-----|---------|---------|
| 1 | Available | CA | 001 | Jan. 1, 2005 | * |
| 1 | Unavailable | CA | 002 | * | Apr. 15, 2012 |
| 2 | Available | IL | 001 | Jan. 1, 2005 | Jan. 1, 2009 |
| 2 | Available | CA | 004 | * | * |

Such a mapping serves to illustrate, for example, that a first insurance policy element denoted by an internal identifier denoted as "1" is available, after Jan. 1, 2005, for insured entities engaged in the business identified by SIC identifier "001" in the State of California. This mapping also indicates, by way of further illustration, that this same kind of coverage is not available in the State of California for insured entities that are engaged in the business that is identified by SIC code "002."

It should be clearly evident from this illustrative example that any given insurance policy element will typically correspond to a plurality of end-user configurable dimensions and further that any given one of the insurance policy elements can also correspond to differing combinations of these insurance entity characterizing elements.

In the examples provided, the "State" and "SIC" dimensions are discrete dimensions; that is, dimensions for which the possible values consist of a finite number of possibilities (such as the 50 U.S. states). It is also possible, however, to represent continuous dimensions using pairs of dimensions. To illustrate this point, and with continued reference to Table 2, the dimensions "EffDate" and "ExpDate", taken together, represent a continuous range of dates beginning on the "EffDate" and continuing through the "ExpDate". While a date range such as this comprises one example in this regard, other similar values, such as the age of a building, can be efficiently expressed in a similar way.

With continued reference to Table 2, it will be noted that some of the fields have a value of "*" for the stored attribute. This is one way by which a wildcard characterization can be utilized to thereby accommodate all potential attribute values for that particular dimension for that particular insurance policy element. To illustrate by way of example, in Table 1, the first row of attribute values includes a wildcard value for the ExpDate dimension. This, in turn, can be taken as a representation that any expiration date of interest in a given application setting can be accommodated without having an impact on the availability or unavailability of that particular insurance policy element.

Another exemplary use of wildcard values is illustrated in Table 3.

TABLE 3

| CovID | Availability | State | SIC | EffDate | ExpDate |
|---|---|---|---|---|---|
| 1 | Available | CA | * | Jan. 1, 2005 | * |
| 2 | Unavailable | * | 002 | * | Apr. 15, 2012 |
| 2 | Available | IL | 002 | Jan. 1, 2005 | Jan. 1, 2009 |
| 2 | Available | NV | 002 | * | * |

Table 3 indicates, via a wildcard value for the SIC dimension, that insurance policy entity "1" is available in California regardless of the business in which the insured party might engage. This result occurs because the coverage appears to be available without regard to the actual value of the SIC dimension attribute.

Those skilled in the art will appreciate that such wildcard values can serve in both an inclusive and an exclusive manner. To illustrate, and again with reference to Table 3 above, the second row indicates, via the wildcard value for the State dimension, that insurance policy entity "2" is unavailable for businesses engaged in SIC 002 activities regardless of the state. The following two rows then indicate that such coverage is, in fact and nevertheless, allowed for the states of Illinois and Nevada.

By this approach, it will be appreciated that characterizing information can be usefully provided for all fifty states in a way that avoids the necessity of uniquely setting forth the specific result for each and every state in a separate and discrete manner. This can, in turn, minimize the data entry task, simplify the matching step described below, and ease the burden of keeping these mappings current and accurate. The use of wildcard values to minimize the number of specific entries that need be made to accurately represent all cases can work particularly well when either most such cases are either included, or excluded, with respect to availability. For example, when a particular coverage is available in each of twenty states for all possible SIC codes, a mere twenty rows in such a mapping (where the wildcard value comprises the entry for the SIC dimension) will suffice to represent all possible permutations for those twenty states with respect to all possible SIC codes. Conversely, when this coverage is available in these twenty states for only half of all available SIC codes (of which there are, in some cases, approximately 3,000), it will potentially require 20*1,500 rows to accurately represent such a scenario.

In some cases where a large number of individual rows are required to adequately represent a given use instance, it can be possible to dynamically add another dimension to simplify things. For example, in some instances where a given coverage is not applicable in each and every state, an additional dimension can be provided to reflect, via a true/false entry, this condition. Such an approach can lead in some instances to a dramatic reduction in the number of rows that might otherwise be required. To illustrate this approach further, a number of U.S. states share common requirements about offering Personal Injury Protection (PIP) coverage, and so it is possible to define a dimension "PIPState" that is simply true or false depending upon whether the given state falls into the set. It can therefore be seen that defining this dimension obviates the need to specifically list out the PIP states each time.

As noted above, this process will accommodate dynamic configuration of the aforementioned dimensions. If desired, this process can also accommodate permitting an end user such as an administrator to dynamically configure one or more of these mappings. This can comprise, for example, dynamically configuring the mappings by at least one of:
   adding an additional mapping;
   deleting one of the mappings; and
   changing one of the mappings.

This process 100 then provides for serving 104 as a matching component by automatically using these mappings to determine available insurance policy elements for the particular candidate insurance entity as a function of its attributes. This can comprise, for example, using the attributes from the first memory that specifically characterize a particular candidate insurance entity to identify a match within the mappings of the second memory. By one approach a "match" can comprise an exact match with respect to the attributes for all available dimensions. By another approach, if desired, a "match" can comprise identifying a particular one of the mappings having a combination of the insurance entity characterizing elements that at least substantially matches the attributes that specifically characterize the particular candidate insurance entity.

In some cases, this step of using the mappings to determine available insurance policy elements can comprise simply seeking matches between the attributes that specifically characterize the candidate insurance entity amongst the attribute values that are directly evident in the mappings. In other cases, when one or more of these attributes comprises an instruction to extract a corresponding value for a given one of the attributes, this step can comprise using this instruction to thereby extract that corresponding value in order to facilitate the making of the aforementioned matching activity.

By one approach, the mappings can be stored in tables in a relational database, in which the columns represent the dimensions and the rows contain individual mapping entries. Typically, the mappings for a particular type of insurance policy element (such as coverages or forms) can be contained in a table for that element type, such that different element types may have different numbers or types of dimensions, corresponding to different columns in the tables. It will be apparent to those skilled in the art how a simple database query can quickly and efficiently find the matching rows given a set of attributes as correspond to the dimensions. For example, an SQL query such as:
   "SELECT * FROM coverage_availability WHERE SIC="001" AND USState = "CA""
will return all rows defining element availability for industry code 001 and the state CA.

This matching step can of course be configured to accommodate the presence of wildcard values when such are present in the mappings. This can comprise, for example, using the mappings to detect such a wildcard characterization which accords all potential attribute values as correspond to a given one of the end user-configurable dimensions as correlating positively to insurance policy element availability (or insurance policy unavailability, as the case may be).

To continue with the database embodiment, the wildcard value can be simply represented in the database using the special value null for a given column. In this case, a query such as"SELECT * FROM coverage_availability WHERE (SIC="001" OR SIC IS NULL) AND (USState="CA" OR USState IS NULL)" will return rows matching either the specified values for SIC and US State, as well as rows containing the wildcard for those dimensions.

The matching step can also be configured to combine values from related dimensions in order to match a given continuous attribute value, such as a date range. In this case, the match is carried out by comparing the attribute value to ascertain that it is greater than or equal to a minimum dimension value and/or less than or equal to a maximum dimension value.

To continue with the database example presented earlier, the attribute value can be compared against the columns expressing the boundaries of the range by using a simple inequality expression. In this case, a query such as "SELECT * FROM coverage_availability WHERE (EffDate <= refDate OR EffDate IS null) AND (ExpDate >= refDate OR ExpDate IS null)" will return rows in which "refDate" (representing the attribute date value of interest) falls within the interval specified by EffDate and ExpDate. If EffDate or ExpDate is null (that is, a wildcard), then the date range will be unbounded at the beginning or end of the range, respectively. While this example uses a date range to illustrate matching a continuous value, a similar approach can be used for matching against continuous ranges consisting of numbers or other continuous data types. Since representing and querying tabular information in a relational database is well understood in the art, no further explanation will be provided here.

When indications of both availability and unavailability are present in the mappings, there is a possibility that multiple matches may occur that can present an apparent conflicting result. A simple example in this regard appears in Table 4.

TABLE 4

| CovID | Availability | State | SIC | EffDate | ExpDate |
|---|---|---|---|---|---|
| 1 | Available | * | * | Jan. 1, 2005 | * |
| 1 | Unavailable | CA | * | Jan. 1, 2005 | * |
| 1 | Available | CA | 002 | Jan. 1, 2005 | * |

In this example, coverage for insurance entity "1" is available everywhere (as per row 1) with the exception of California (as per row 2), except that coverage is shown as being available in California provided the SIC code is "002" (as per row 3). By one approach, such a conflict can be easily resolved by requiring that, in the event of a conflict, the conditions of the row containing the greater degree of specificity shall prevail.

Using such an approach, and by way of illustrative example, a search for matches with attributes that specify the State as being "California" and the SIC code as being "001" will yield both row 1 and row 2 as being such a match. Row 2, however, presents greater specificity in this regard and hence the "unavailable" result which corresponds to row 2 can be taken as the conclusion of this step. Similarly, when the attributes specify the State as being "California" and the SIC code as being "002" the "available" result associated with row 3 can be taken as the result of the matching search as row 3 is more specific in this regard than row 2.

In some cases, there may be multiple matching rows where none are clearly more specific than the others. Such an example appears in Table 5.

TABLE 5

| CovID | Availability | State | SIC | EffDate | ExpDate |
|---|---|---|---|---|---|
| 1 | Available | * | * | Jan. 1, 2005 | * |
| 1 | Unavailable | CA | * | Jan. 1, 2005 | * |
| 1 | Available | * | 002 | Jan. 1, 2005 | * |

In such a case, and when searching for a match when the attributes are specified as State=California and SIC=002, all three of these rows would yield a match and thereby create a conflict with respect to whether the corresponding insurance entity is available or unavailable. By one approach, at least some of the dimensions can be previously assigned a corresponding distinct precedence. This could be done, for example, via use of metadata for such a table. This might comprise, for example, using a range of integer values where large values indicate a corresponding higher precedence.

In such a case, when such a circumstance arises, the dimensions can be considered in order of increasing precedence. To illustrate, it will be presumed for this example that the State dimension has a precedence of "1" while the SIC dimension has a precedence of "2." Accordingly, this process would first consider matches for the attribute values in the State dimension for each row. A determination can be made as to whether any of the rows contains a specific value (as versus a wildcard value) for the State dimension. When true, those rows would be retained while the remaining rows would be discarded from further consideration. When all the rows contain only a wildcard value, all of the rows will be retained as the process iterates to consider the next dimension in the order of precedence.

This process can be repeated as necessary to identify a single remaining best match. If multiple rows remain after considering all of the dimension in this manner, an error condition can be returned by the process 100 (as this should only occur if there are multiple rows which contain identical values for all of their dimensions). One possible exception to consider in this regard is to note whether all of the remaining rows agree as to the availability or unavailability of the insurance entity. When, for example, unanimous consensus exists in this regard, one may wish to accept that consensus view in lieu of returning an error condition.

If desired, the dimensionality as accommodated by this mapping approach can be configured to include a Start Effective Date (to indicate when the insurance entity becomes/became effective), and an End Effective Date (to indicate when the insurance entity becomes/became ineffective).

This process 100 then provides for automatically using 105 the availability insurance policy elements to configure an insurance policy that is consistent with the mappings. In particular, this can comprise not using insurance policy elements that are not available (as determined via the matching step described above) and using the insurance policy elements that are determined to be available and which match the needs of the moment as determined by the characterizing attributes for the candidate insurance entity. By one approach, of course, this can comprise facilitating the automatic assembling, in the first instance, of a given insurance policy which includes the matching, available insurance policy elements along with such other content as may be desirable or appropriate.

This step of using these available insurance policy elements to configure an insurance policy that is consistent with the mappings can assume other forms, however. As one example in this regard, this can comprise providing options regarding a plurality of available insurance policy elements which are available to select and incorporate into an insurance policy. These options might be displayed, for example, on a display screen to an insurance agent and/or a candidate insured party to thereby prompt their selection of one or more such options.

As another example in these regards, this can comprise identifying insurance policy elements for an existing policy that are no longer available and which should be removed.

This, in turn, can serve as an automated prompt to encourage or drive the behaviors of corresponding authorized representatives of the insurer and/or to facilitate, for example, the automated presentation of a corresponding communication to the insured.

As yet another example in this regard, this can also comprise adding elements to an existing policy, which elements are now identified as being presently required. Such an action can be warranted, for example, when a given state enacts a law requiring particular treatment of a particular insured event and when compliance with that law is immediately mandatory.

Figure 2:
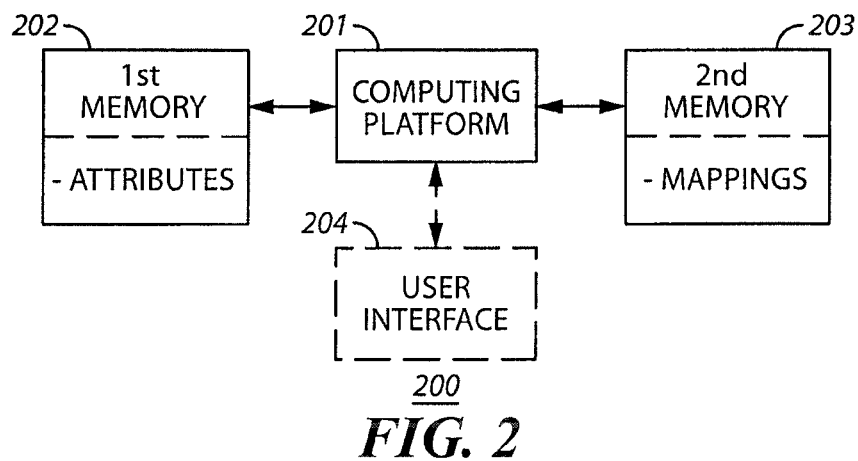
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative example, the enabling apparatus 200 can comprise a computing platform 201 of choice. Those skilled in the art will recognize and appreciate that such a computing platform 201 can comprise a fixed-purpose hard-wired platform or can comprise a partially or wholly programmable platform. All of these architectural options are well known and understood in the art and require no further description here.

This computing platform 201 operably couples to a first memory 202 which stores the aforementioned attributes and also to a second memory 203 which stores the aforementioned mappings. The memories 202 and 203 thereby make this information available to the computing platform 201. It will be understood that the memory components shown can comprise a plurality of memory elements (as is suggested by the illustration) or can be comprised of a single memory element as desired.

If desired, this apparatus 200 can further optionally comprise a user interface 204 which also operably couples to the computing platform 201. This can comprise, for example, an input mechanism to permit an end user to effect the aforementioned dynamic configuration of the dimensions. This can also comprise, as desired and again by example, an output mechanism such as a display, a network connection (to permit, for example, providing content to an email server for forwarding to a given address of choice), or printer by which the aforementioned mapping usage results and deliverables can be provided to an end user.

This computing platform 201 can be configured and arranged (using, for example, programming as will be well understood by those skilled in the art) to carry out one or more of the steps, actions, and functionality as is set forth herein. This can specifically include, by way of example, accessing the first memory 202 to access the attributes which specifically characterize a particular candidate insurance entity, accessing the second memory 203 to access the mappings that relate insurance policy element availability for a plurality of insurance policy elements to various corresponding insurance entity characterizing attributes, using the mappings as a matching component to determine those insurance policy elements that are available for the candidate insurance entity as a function of the attributes which characterize that entity, and using those identified available insurance policy elements to configure an insurance policy consistent with the mappings.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as is known in the art.

So configured, those skilled in the art will recognize and appreciate that a highly complex, voluminous, frequently dynamic, and occasionally seemingly inconsistent set of requirements and limitations with respect to the offering of various kinds of insurance coverage can be readily accommodated in a way that permits rapid and accurate identification of those insurance policy elements that are genuinely and usefully applicable for use in conjunction with a particular insurance opportunity. These teachings are highly scalable and will readily accommodate a large number of dimensions, range of attribute values, and insurance policy elements. These teachings are also highly leverageable and will readily accommodate, for example, a wide variety of uses for the resultant availability information.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one illustrative example in this regard, the aforementioned dimensions can include one or more dimensions that refer, directly (for example, by name) or indirectly (for example, by title or role), to the end user (or other individual or entity) who is seeking to configure the policy. This would permit, for example, a senior underwriter or supervisor to have coverages available to them which are not made available to everyone.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor;
a memory coupled to the processor, configured to store a mapping table comprising a plurality of combinations of values of attributes of entities to be insured and a plurality of availability indicators mapped to the plurality of combinations of values of attributes; wherein:
the values of attributes characterize entities to be insured;
the attributes include at least an effective date, an expiration date, a geographical location, a jurisdiction, or an industrial classification identifier; and
an availability indicator indicates whether an insurance policy element is available for inclusion in insurance policies given a corresponding combination of values of attributes to which the availability indicator is mapped;
the insurance policy elements include at least a coverage, a coverage term, a form, an endorsement, a modifier, or an exclusion; and
the processor is configured to:
obtain a plurality of values of attributes of a particular entity to be insured;
use the plurality of values of attributes of the particular entity to identify within the mapping table one or more matching availability indicators that correspond to the obtained plurality of values of attributes;

determine one or more insurance policy elements that correspond to the matching availability indicators;

configure the insurance policy for the particular entity to be insured based on the determined one or more insurance policy elements and the one or more matching availability indicators, wherein the insurance policy for the particular entity to be insured includes more than one insurance policy elements, and wherein an insurance policy element associated with a matching availability indicator indicating that the insurance policy element is available is included in the insurance policy, and an insurance policy element associated with a matching availability indicator indicating that the insurance policy element is unavailable is excluded from the insurance policy.

2. The system of claim 1, wherein:

at least some of the mapping information correspond to respective end-user configurable mapping information; and the processor is further adapted to receive instructions to add, delete, or modify an end-user configurable mapping information based on a user input.

3. A system comprising:

a computer processor adapted to:

obtain a plurality of values of attributes of a particular entity to be insured, wherein the values of attributes characterize the particular entity to be insured;

access mapping information that indicates, for a plurality of combinations of values of attributes of entities to be insured, whether corresponding insurance policy elements are available for inclusion in insurance policies; wherein:

the mapping information comprising a plurality of combinations of values of attributes and a plurality of availability indicators mapped to the plurality of combinations of values of attributes, the plurality of availability indicators indicating whether corresponding insurance policy elements are available or unavailable for inclusion in insurance policies given corresponding combinations of values of attributes to which the availability indicators are mapped;

the insurance policy elements include at least a coverage, a coverage term, a form, an endorsement, a modifier, or an exclusion, and an insurance policy includes more than one insurance policy elements; and the attributes include at least an effective date, an expiration date, a geographical location, a jurisdiction, or an industrial classification identifier;

determine, based on the mapping information and the obtained plurality of values of attributes of the particular entity to be insured, available insurance policy elements for inclusion in an insurance policy for the particular entity to be insured, including looking up in the mapping information one or more matching combinations of values of attributes of the particular entity to be insured, and availability indicators of one or more insurance policy elements that correspond to the one or more matching combinations of values of attributes; and configure the insurance policy for the particular entity to be insured to include more than one of the available insurance policy elements; and a memory coupled to the processor, configured to provide the processor with instructions.

4. The system of claim 3, where the mapping information comprising a table that stores the plurality of combinations of values of attributes of entities to be insured and the corresponding indicators.

5. The system of claim 4, wherein the table is a compressed table in which at least some of the values of attributes in the table includes a wildcard value.

6. The system of claim 4, wherein the table is a compressed table in which some of the values of attributes in the table include a wildcard value, and the wildcard value indicates that the corresponding attribute in the table does not affect whether the corresponding insurance policy element is available for inclusion in insurance policies.

7. The system of claim 3, wherein the insurance policy for the particular entity to be insured is a new insurance policy.

8. The system of claim 3, wherein the insurance policy for the particular entity to be insured is an existing insurance policy to be updated.

9. The system of claim 3, wherein at least some of the values of attributes correspond to respective end-user configurable dimensions.

10. The system of claim 3, wherein:

at least some of the values of attributes correspond to respective end-user configurable dimensions; and the processor is further adapted to receive instructions to add, delete, or modify an end user configurable dimension based on a user input.

11. The system of claim 3, wherein configuring the available insurance policy elements includes providing options to select specific ones of the available insurance policy elements to incorporate into the insurance policy for the particular entity to be insured.

12. The system of claim 3, wherein configuring the available insurance policy elements includes automatically removing an insurance policy element that is no longer available for inclusion in the insurance policy for the particular entity to be insured.

13. The system of claim 3, wherein configuring the available insurance policy elements includes automatically adding an insurance policy element that is required for inclusion in the insurance policy for the particular entity to be insured.

14. The system of claim 3, wherein at least some values of attributes of entities to be insured are associated with corresponding precedence.

15. The system of claim 3, wherein:

at least some values of attributes of entities to be insured are associated with corresponding precedence;

in the event that there is a conflict in the availabilities of insurance policy elements that corresponding to matching combinations of values of attributes that are consistent with the plurality of values of attributes of the particular entity to be insured, the processor is further adapted to resolve the conflict based on order of precedence.

16. The system of claim 3, wherein:

at least some of the mapping information correspond to respective end-user configurable mapping information; and the processor is further adapted to receive instructions to add, delete, or modify an end-user configurable mapping information based on a user input.

17. A method comprising:

obtaining, using one or more computer processors, a plurality of values of attributes of a particular entity to be insured, wherein the values of attributes characterize the particular entity to be insured;

accessing, using the one or more computer processors, mapping information that indicates, for a plurality of combinations of values of attributes of entities to be insured, whether corresponding insurance policy elements are available for inclusion in insurance policies; wherein:

the mapping information comprising a plurality of combinations of values of attributes and a plurality of availability indicators mapped to the plurality of combinations of values of attributes, the plurality of availability indicators indicating whether corresponding insurance policy elements are available for inclusion in insurance policies given corresponding combinations of values of attributes to which the availability indicators are mapped;

the insurance policy elements include at least a coverage, a coverage term, a form, an endorsement, a modifier, or an exclusion, and an insurance policy includes more than one insurance policy elements; and the attributes include at least an effective date, an expiration date, a geographical location, a jurisdiction, or an industrial classification identifier;

determining, using the one or more processors, based on the mapping information and the obtained plurality of values of attributes of the particular entity to be insured, available insurance policy elements for inclusion in an insurance policy for the particular entity to be insured, including looking up in the mapping information one or more matching combinations of values of attributes of the particular entity to be insured, and availability indicators of one or more insurance policy elements that correspond to the one or more matching combinations of values of attributes; and configuring, using the one or more processors, the insurance policy for the particular entity to be insured to include more than one of the available insurance policy elements.

18. The method of claim 17, where the mapping information comprising a table that stores the plurality of combinations of values of attributes of entities to be insured and the corresponding indicators.

19. The method of claim 18, wherein the table is a compressed table in which at least some of the values of attributes in the table includes a wildcard value.

20. The method of claim 18, wherein the table is a compressed table in which some of the values of attributes in the table include a wildcard value, and the wildcard value indicates that the corresponding attribute in the table does not affect whether the corresponding insurance policy element is available for inclusion in insurance policies.

21. The method of claim 17, wherein at least some of the values of attributes correspond to respective end-user configurable dimensions.

22. The method of claim 17, wherein at least some of the values of attributes are associated with corresponding precedence.

23. The method of claim 17, wherein:

at least some of the mapping information correspond to respective end-user configurable mapping information; and the processor is further adapted to receive instructions to add, delete, or modify an end-user configurable mapping information based on a user input.

24. A system comprising:

a computer processor adapted to:

obtain a plurality of values of attributes of a particular entity to be insured, wherein the values of attributes characterize the particular entity to be insured;

access mapping information that indicates, for a plurality of combinations of values of attributes of entities to be insured, whether corresponding insurance policy elements are available for inclusion in insurance policies;

determine, based on the mapping information and the obtained plurality of values of attributes of the particular entity to be insured, available insurance policy elements for inclusion in an insurance policy for the particular entity to be insured, wherein the insurance policy for the particular entity to be insured includes more than one available insurance policy elements; and configure the insurance policy for the particular entity to be insured to include a plurality of the available insurance policy elements; and a memory coupled to the computer processor, configured to provide the computer processor with instructions.

25. The system of claim 24, wherein:

at least some of the mapping information correspond to respective end-user configurable mapping information; and the processor is further adapted to receive instructions to add, delete, or modify an end-user configurable mapping information based on a user input.

* * * * *